US006717130B2

(12) United States Patent
Bateman et al.

(10) Patent No.: US 6,717,130 B2
(45) Date of Patent: Apr. 6, 2004

(54) METHODS AND APPARATUS FOR MASS SPECTROMETRY

(75) Inventors: Robert Harold Bateman, Knutsford (GB); John Brian Hoyes, Stockport (GB); Edward James Clayton, Macclesfield (GB)

(73) Assignee: Micromass Limited, Manchester (GB)

( * ) Notice: Subject to any disclaimer, the term of this patent is extended or adjusted under 35 U.S.C. 154(b) by 132 days.

(21) Appl. No.: 09/876,122

(22) Filed: Jun. 8, 2001

(65) Prior Publication Data

US 2002/0063206 A1 May 30, 2002

(30) Foreign Application Priority Data

Jun. 9, 2000 (GB) .......... 0014062
Jan. 15, 2001 (GB) .......... 0101048
Mar. 2, 2001 (GB) .......... 0105227

(51) Int. Cl.[7] .......... B01D 59/44
(52) U.S. Cl. .......... 250/282; 250/281; 250/287; 250/288
(58) Field of Search .......... 250/282, 288, 250/281, 287

(56) References Cited

U.S. PATENT DOCUMENTS

| | | | | |
|---|---|---|---|---|
| 4,851,669 A | | 7/1989 | Aberth | |
| 5,073,713 A | * | 12/1991 | Smith et al. | 250/282 |
| 6,107,623 A | | 8/2000 | Bateman et al. | |
| 6,204,500 B1 | * | 3/2001 | Whitehouse et al. | 250/287 |
| 6,323,482 B1 | * | 11/2001 | Clemmer et al. | 250/287 |
| 6,331,702 B1 | * | 12/2001 | Krutchinsky et al. | 250/281 |

FOREIGN PATENT DOCUMENTS

| | | |
|---|---|---|
| EP | 898297 | 2/1999 |
| EP | 1006559 | 6/2000 |
| EP | 1047107 | 10/2000 |
| GB | 2300967 | 11/1996 |

OTHER PUBLICATIONS

Yost et al., "Tandem Quadrupole Mass Spectrometry", Ed. McLafferty pub John Wiley and Sons, Ch. 8, pp. 175–195, 1983.

Huang et al., "Characterization of Cyclodextrins Using Ion–evaporation Atmospheric–pressure Ionization Tandem Mass Spectrometry", Rapid Communications in Mass Spectrometry, vol. 4, No. 11, pp. 467–471, 1990.

Morris et al., "High Sensitivity Collisionally–activated Decomposition Tandem Mas Spectrometry on a Novel Quadrupole/Orthogonal–acceleration Time–of–flight Mass Spectrometer", Rapid Communications in Mass Spectrometry, vol. 10, pp. 879–896, 1996.

Morris et al., "A Novel Geometry Mass Spectrometer, the Q–TOF, for Low–Femtomole/Attomole–Range Biopolymer Sequencing", Journal of Protein Chemistry, vol. 16, No. 5, pp. 469–479, 1997.

(List continued on next page.)

*Primary Examiner*—John R. Lee
*Assistant Examiner*—Paul M. Gurzo
(74) *Attorney, Agent, or Firm*—Diederiks & Whitelaw, PLC

(57) ABSTRACT

A method is disclosed of identifying parent ions by matching daughter ions found to be produced at substantially the same time that the parent ions elute from a mixture. Ions emitted from an ion source are incident upon a collision cell which alternately and repeatedly switches between a first mode wherein the ions are substantially fragmented to produce daughter ions and a second mode wherein the ions are not substantially fragmented. Mass spectra are taken in both modes, and at the end of an experimental run parent and daughter ions are recognized by comparing the mass spectra obtained in the two different modes. Daughter ions are matched to particular parent ions on the basis of the closeness of fit of their elution times, and this enables parent ions to then be identified.

64 Claims, 10 Drawing Sheets

OTHER PUBLICATIONS

Borchers et al., "Preliminary comparison of precursor scans and liquid chromatography–tandem mass spectrometry on a hybrid quadrupole time–of–flight mass spectrometer", Journal of Chromatography, A.854, pp. 119–130, 1999.

Charlwood, et al., "Structural Characterisation of N–Linked Glycan Mixtures by Precursor Ion Scanning and Tandem Mass Spectrometric Analysis", Rapid Communications in Mass Spectrometry 13, pp. 1522–1530, 1999.

Hopfgartner et al., "Exact Mass Measurement of Product Ions for the Structural Elucidation of Drug Metabolites with a Tandem Quadrupole Orthogonal–Acceleration Time–of––Flight Mass Spectrometer", Am. Soc. M.S., vol. 10(12), pp. 1305–1314, 1999.

Guicloek et al., "Structural Elucidation in the Millisecond Time Frame Using Fast In–Source CID API Time–of–Flight MS", pp. 891.

* cited by examiner

MS High collision energy
-daughter ion spectrum

MS Low collision energy
-parent ion spectrum

Mass chromatogram of 87.04 (Asparagine immonium ion)

Fragment T5 from ADH Sequence ANELLINVK MW 1012.59

METHODS AND APPARATUS FOR MASS SPECTROMETRY

BACKGROUND OF THE INVENTION

1. Field of the Invention

The present invention relates to methods and apparatus for mass spectrometry.

2. Discussion of the Prior Art

Tandem mass spectrometry (MS/MS) is the name given to the method of mass spectrometry wherein parent ions generated from a sample are selected by a first mass filter/analyser and are then passed to a collision cell wherein they are fragmented by collisions with neutral gas molecules to yield daughter (or "product") ions. The daughter ions are then mass analysed by a second mass filter/analyser, and the resulting daughter ion spectra can be used to determine the structure and hence identify the parent (or "precursor") ion. Tandem mass spectrometry is particularly useful for the analysis of complex mixtures such as biomolecules since it avoids the need for chemical clean-up prior to mass spectral analysis.

A particular form of tandem mass spectrometry referred to as parent ion scanning is known, wherein in a first step the second mass filter/analyser is arranged to act as a mass filter so that it will only transmit and detect daughter ions having a specific mass-to-charge ratio. The specific mass-to-charge ratio is set so as to correspond with the mass-to-charge ratio of daughter ions which are known to be characteristic products which result from the fragmentation of a particular parent ion or type of parent ion. The first mass filter/analyser upstream of the collision cell is then scanned whilst the second mass filter/analyser remains fixed to monitor for the presence of daughter ions having the specific mass-to-charge ratio. The parent ion mass-to-charge ratios which yield the characteristic daughter ions can then be determined. As a second step, a complete daughter ion spectrum for each of the parent ion mass-to-charge ratios which produce characteristic daughter ions may then be obtained by operating the first mass filter/analyser so that it selects parent ions having a particular mass-to-charge ratio, and scanning the second mass filter/analyser to record the resulting full daughter ion spectrum. This can then be repeated for the other parent ions of interest. Parent ion scanning is useful when it is not possible to identify parent ions in a direct mass spectrum due to the presence of chemical noise, which is frequently encountered, for example, in the electrospray mass spectra of biomolecules.

Triple quadrupole mass spectrometers having a first quadrupole mass filter/analyser, a quadrupole collision cell into which a collision gas is introduced, and a second quadrupole mass filter/analyser are well known. Another type of mass spectrometer (a hybrid quadrupole-time of flight mass spectrometer) is known wherein the second quadrupole mass filter/analyser is replaced by an orthogonal time of flight mass analyser.

As will be shown below, both types of mass spectrometers when used to perform conventional methods of parent ion scanning and subsequently obtaining a daughter ion spectrum of a candidate parent ion suffer from low duty cycles which render them unsuitable for use in applications which require a higher duty cycle such as on-line chromatography applications.

Quadrupoles have a duty cycle of approximately 100% when being used as a mass filter, but their duty cycle drops to around 0.1% when then are used in a scanning mode as a mass analyser, for example, to mass analyse a mass range of 500 mass units with peaks one mass unit wide at their base.

Orthogonal acceleration time of flight analysers typically have a duty cycle within the range 1–20% depending upon the relative mass to charge ("m/z") values of the different ions in the spectrum. However, the duty cycle remains the same irrespective of whether the time of flight analyser is being used as a mass filter to transmit ions having a particular mass to charge ratio, or whether the time of flight analyser is being used to record a full mass spectrum. This is due to the nature of operation of time of flight analysers. When used to acquire and record a daughter ion spectrum the duty cycle of a time of flight analyser is typically around 5%.

To a first approximation the conventional duty cycle when seeking to discover candidate parent ions using a triple quadrupole mass spectrometer is approximately 0.1% (the first quadrupole mass filter/analyser is scanned with a duty cycle of 0.1% and the second quadrupole mass filter/analyser acts as a mass filter with a duty cycle of 100%). The duty cycle when then obtaining a daughter ion spectrum for a particular candidate parent ion is also approximately 0.1% (the first quadrupole mass filter/analyser acts as a mass filter with a duty cycle of 100%, and the second quadrupole mass filter/analyser is scanned with a duty cycle of approximately 0.1%). The resultant duty cycle therefore of discovering a number of candidate parent ions and producing a daughter spectrum of one of the candidate parent ions is approximately 0.1%/2 (due to a two stage process with each stage having a duty cycle of 0.1%)=0.05%.

The duty cycle of a quadrupole-time of flight mass spectrometer for discovering candidate parent ions is approximately 0.005% (the quadrupole is scanned with a duty cycle of approximately 0.1% and the time of flight analyser acts a mass filter with a duty cycle of approximately 5%). Once candidate parent ions have been discovered, a daughter ion spectrum of a candidate parent ion can be obtained with an duty cycle of 5% (the quadrupole acts as a mass filter with a duty cycle of approximately 100% and the time of flight analyser is scanned with a duty cycle of 5%). The resultant duty cycle therefore of discovering a number of candidate parent ions and producing a daughter spectrum of one of the candidate parent ions is approximately 0.005% (since 0.005%<<5%).

As can be seen, a triple quadrupole has approximately an order higher duty cycle than a quadrupole-time of flight mass spectrometer for performing conventional methods of parent ion scanning and obtaining confirmatory daughter ion spectra of discovered candidate parent ions. However, such duty cycles are not high enough to be used practically and efficiently for analysing real time data which is required when the source of ions is the eluent from a chromatography device.

Electrospray and laser desorption techniques have made it possible to generate molecular ions having very high molecular weights, and time of flight mass analysers are advantageous for the analysis of such large mass biomolecules by virtue of their high efficiency at recording a full mass spectrum. They also have a high resolution and mass accuracy.

Other forms of mass analysers such as quadrupole ion traps are similar in some ways to time of flight analysers, in that like time of flight analysers, they can not provide a continuous output and hence have a low efficiency if used as a mass filter to continuously transmit ions which is an important feature of the conventional methods of parent ion scanning. Both time of flight mass analysers and quadrupole ion traps may be termed “discontinuous output mass analysers”.

It is desired to provide improved methods and apparatus for mass spectrometry. In particular, it is desired to identify parent ions in chromatography applications.

Parent ions that belong to a particular class of parent ions, and which are recognisable by a characteristic daughter ion or characteristic “neutral loss”, are traditionally discovered by the methods of “parent ion” scanning or “constant neutral loss” scanning. Previous methods for recording “parent ion” scans or “constant neutral loss” scans involve scanning one or both quadrupoles in a triple quadrupole mass spectrometer, or scanning the quadrupole in a tandem quadrupole orthogonal TOF mass spectrometer, or scanning at least one element in other types of tandem mass spectrometers. As a consequence, these methods suffer from the low duty cycle associated with scanning instruments. As a further consequence, information may be discarded and lost whilst the mass spectrometer is occupied recording a “parent ion” scan or a “constant neutral loss” scan. As a further consequence these methods are not appropriate for use where the mass spectrometer is required to analyse substances eluting directly from gas or liquid chromatography equipment.

SUMMARY OF THE INVENTION

According to the preferred embodiment, a tandem quadrupole orthogonal TOF mass spectrometer is used in a way in which candidate parent ions are discovered using a method in which sequential low and high collision energy mass spectra are recorded. The switching back and forth is not interrupted. Instead a complete set of data is acquired, and this is then processed afterwards. Fragment ions are associated with parent ions by closeness of fit of their respective elution times. In this way candidate parent ions may be confirmed or otherwise without interrupting the acquisition of data, and information need not be lost.

Once an experimental run has been completed, the high and low fragmentation mass spectra are then post-processed. Parent ions are recognised by comparing a high fragmentation mass spectrum with a low fragmentation mass spectrum obtained at substantially the same time, and noting ions having a greater intensity in the low fragmentation mass spectrum relative to the high fragmentation mass spectrum. Similarly, daughter ions may be recognised by noting ions having a greater intensity in the high fragmentation mass spectrum relative to the low fragmentation mass spectrum.

Once a number of parent ions have been recognised, a sub-group of possible candidate parent ions may be selected from all of the parent ions. According to one embodiment, possible candidate parent ions may be selected on the basis of their relationship to a predetermined daughter ion. The predetermined daughter ion may comprise, for example, ions selected from the group comprising: (i) immonium ions from peptides; (ii) functional groups including phosphate group $PO_3$ ions from phosphorylated peptides; and (iii) mass tags which are intended to cleave from a specific molecule or class of molecule and to be subsequently identified thus reporting the presence of the specific molecule or class of molecule. A parent ion may be short listed as a possible candidate parent ion by generating a mass chromatogram for the predetermined daughter ion using high fragmentation mass spectra. The centre of each peak in the mass chromatogram is then determined together with the corresponding predetermined daughter ion elution time(s). Then for each peak in the predetermined daughter ion mass chromatogram both the low fragmentation mass spectrum obtained immediately before the predetermined daughter ion elution time and the low fragmentation mass spectrum obtained immediately after the predetermined daughter ion elution time are interrogated for the presence of previously recognised parent ions. A mass chromatogram for any previously recognised parent ion found to be present in both the low fragmentation mass spectrum obtained immediately before the predetermined daughter ion elution time and the low fragmentation mass spectrum obtained immediately after the predetermined daughter ion elution time is then generated and the centre of each peak in each mass chromatogram is determined together with the corresponding possible candidate parent ion elution time(s). The possible candidate parent ions may then be ranked according to the closeness of fit of their elution time with the predetermined daughter ion elution time, and a list of final candidate parent ions may be formed by rejecting possible candidate parent ions if their elution time precedes or exceeds the predetermined daughter ion elution time by more than a predetermined amount.

According to an alternative embodiment, a parent ion may be shortlisted as a possible candidate parent ion on the basis of it giving rise to a predetermined mass loss. For each low fragmentation mass spectrum, a list of target daughter ion mass to charge values that would result from the loss of a predetermined ion or neutral particle from each previously recognised parent ion present in the low fragmentation mass spectrum is generated. Then both the high fragmentation mass spectrum obtained immediately before the low fragmentation mass spectrum and the high fragmentation mass spectrum obtained immediately after the low fragmentation mass spectrum are interrogated for the presence of daughter ions having a mass to charge value corresponding with a target daughter ion mass to charge value. A list of possible candidate parent ions (optionally including their corresponding daughter ions) is then formed by including in the list a parent ion if a daughter ion having a mass to charge value corresponding with a target daughter ion mass to charge value is found to be present in both the high fragmentation mass spectrum immediately before the low fragmentation mass spectrum and the high fragmentation mass spectrum immediately after the low fragmentation mass spectrum. A mass loss chromatogram may then be generated based upon possible candidate parent ions and their corresponding daughter ions. The centre of each peak in the mass loss chromatogram is determined together with the corresponding mass loss elution time(s). Then for each possible candidate parent ion a mass chromatogram is generated using the low fragmentation mass spectra. A corresponding daughter ion mass chromatogram is also generated for the corresponding daughter ion. The centre of each peak in the possible candidate parent ion mass chromatogram and the corresponding daughter ion mass chromatogram are then determined together with the corresponding possible candidate parent ion elution time(s) and corresponding daughter ion elution time(s). A list of final candidate parent ions may then be formed by rejecting possible candidate parent ions if the elution time of a possible candidate parent ion precedes or exceeds the corresponding daughter ion elution time by more than a predetermined amount.

Once a list of final candidate parent ions has been formed (which preferably comprises only some of the originally recognised parent ions and possible candidate parent ions) then each final candidate parent ion can then be identified.

Identification of parent ions may be achieved by making use of a combination of information. This may include the accurately determined mass of the parent ion. It may also include the masses of the fragment ions. In some instances the accurately determined masses of the daughter ions may be preferred. It is known that a protein may be identified from the masses, preferably the exact masses, of the peptide products from proteins that have been enzymatically digested. These may be compared to those expected from a library of known proteins. It is also known that when the results of this comparison suggest more than one possible protein then the ambiguity can be resolved by analysis of the fragments of one or more of the peptides. The preferred embodiment allows a mixture of proteins, which have been enzymatically digested, to be identified in a single analysis. The masses, or exact masses, of all the peptides and their associated fragment ions may be searched against a library of known proteins. Alternatively, the peptide masses, or exact masses, may be searched against the library of known proteins, and where more than one protein is suggested the correct protein may be confirmed by searching for fragment ions which match those to be expected from the relevant peptides from each candidate protein.

The step of identifying each final candidate parent ion preferably comprises: recalling the elution time of the final candidate parent ion, generating a list of possible candidate daughter ions which comprises previously recognised daughter ions which are present in both the low fragmentation mass spectrum obtained immediately before the elution time of the final candidate parent ion and the low fragmentation mass spectrum obtained immediately after the elution time of the final candidate parent ion, generating a mass chromatogram of each possible candidate daughter ion, determining the centre of each peak in each possible candidate daughter ion mass chromatogram, and determining the corresponding possible candidate daughter ion elution time(s). The possible candidate daughter ions may then be ranked according to the closeness of fit of their elution time with the elution time of the final candidate parent ion. A list of final candidate daughter ions may then be formed by rejecting possible candidate daughter ions if the elution time of the possible candidate daughter ion precedes or exceeds the elution time of the final candidate parent ion by more than a predetermined amount.

The list of final candidate daughter ions may be yet further refined or reduced by generating a list of neighbouring parent ions which are present in the low fragmentation mass spectrum obtained nearest in time to the elution time of the final candidate parent ion. A mass chromatogram of each parent ion contained in the list is then generated and the centre of each mass chromatogram is determined along with the corresponding neighbouring parent ion elution time(s). Any final candidate daughter ion having an elution time which corresponds more closely with a neighbouring parent ion elution time than with the elution time of the final candidate parent ion may then be rejected from the list of final candidate daughter ions.

Final candidate daughter ions may be assigned to a final candidate parent ion according to the closeness of fit of their elution times, and all final candidate daughter ions which have been associated with the final candidate parent ion may be listed.

An alternative embodiment which involves a greater amount of data processing but yet which is intrinsically simpler is also contemplated. Once parent and daughter ions have been identified, then a parent ion mass chromatogram for each recognised parent ion is generated. The centre of each peak in the parent ion mass chromatogram and the corresponding parent ion elution time(s) are then determined. Similarly, a daughter ion mass chromatogram for each recognised daughter ion is generated, and the centre of each peak in the daughter ion mass chromatogram and the corresponding daughter ion elution time(s) are then determined. Rather than then identifying only a sub-set of the recognised parent ions, all (or nearly all) of the recognised parent ions are then identified. Daughter ions are assigned to parent ions according to the closeness of fit of their respective elution times and all daughter ions which have been associated with a parent ion may then be listed.

Although not essential to the present invention, ions generated by the ion source may be passed through a mass filter, preferably a quadrupole mass filter, prior to being passed to the fragmentation means. This presents an alternative or an additional method of recognising a daughter ion. A daughter ion may be recognised by recognising ions in a high fragmentation mass spectrum which have a mass to charge ratio which is not transmitted by the fragmentation means i.e. daughter ions are recognised by virtue of their having a mass to charge ratio falling outside of the transmission window of the mass filter. If the ions would not be transmitted by the mass filter then they must have been produced in the fragmentation means.

The ion source may be either an electrospray, atmospheric pressure chemical ionization or matrix assisted laser desorption ionization ("MALDI") ion source. Such ion sources may be provided with an eluent over a period of time, the eluent having been separated from a mixture by means of liquid chromatography or capillary electrophoresis.

Alternatively, the ion source may be an electron impact, chemical ionization or field ionisation ion source. Such ion sources may be provided with an eluent over a period of time, the eluent having been separated from a mixture by means of gas chromatography.

A mass filter, preferably a quadrupole mass filter, may be provided upstream of the collision cell. However, a mass filter is not essential to the present invention. The mass filter may have a highpass filter characteristic and, for example, be arranged to transmit ions having a mass to charge ratio selected from the group comprising: (i) $\leqq 100$; (ii) $\leqq 150$; (iii) $\leqq 200$; (iv) $\leqq 250$; (v) $\leqq 300$; (vi) $\leqq 350$; (vii) $\leqq 400$; (viii) $\leqq 450$; and (ix) $\leqq 500$. Alternatively, the mass filter may have a lowpass or bandpass filter characteristic.

Although not essential, an ion guide may be provided upstream of the collision cell. The ion guide may be either a hexapole, quadrupole or octapole.

Alternatively, the ion guide may comprise a plurality of ring electrodes having substantially constant internal diameters ("ion tunnel") or a plurality of ring electrodes having substantially tapering internal diameters ("ion funnel").

The mass analyser is preferably either a quadrupole mass filter, a time-of-flight mass analyser (preferably an orthogonal acceleration time-of-flight mass analyser), an ion trap, a magnetic sector analyser or a Fourier Transform Ion Cyclotron Resonance ("FTICR") mass analyser.

The collision cell may be either a quadrupole rod set, a hexapole rod set or an octopole rod set wherein neighbouring rods are maintained at substantially the same DC voltage, and a RF voltage is applied to the rods. The collision cell preferably forms a substantially gas-tight enclosure apart from an ion entrance and ion exit aperture. A collision gas such as helium, argon, nitrogen, air or methane may be introduced into the collision cell.

In a first mode of operation (i.e. high fragmentation mode) a voltage may be supplied to the collision cell selected from the group comprising: (i) ≧15V; (ii) ≧20V; (iii) ≧25V; (iv) ≧30V; (v) ≧50V; (vi) ≧100V; (vii) ≧150V; and (viii) ≧200V. In a second mode of operation (i.e. low fragmentation mode) a voltage may be supplied to the collision cell selected from the group comprising: (i) ≦5V; (ii) ≦4.5V; (iii) ≦4V; (iv) ≦3.5V; (v) ≦3V; (vi) ≦2.5V; (vii) ≦2V; (viii) ≦1.5V; (ix) ≦1V; (x) ≦0.5V; and (xi) substantially OV. However, according to less preferred embodiments, voltages below 15V may be supplied in the first mode and/or voltages above 5V may be supplied in the second mode. For example, in either the first or the second mode a voltage of around 10V may be supplied. Preferably, the voltage difference between the two modes is at least 5V, 10V, 15V, 20V, 25V, 30V, 35V, 40V, 50V or more than 50V.

BRIEF DESCRIPTION OF THE DRAWINGS

Various embodiments of the present invention will now be described, by way of example only, and with reference to the accompanying drawings in which:

FIG. 3(*b*) shows the corresponding parent ion mass spectrum with a mass filter allowing ions having a m/z>350 to be transmitted;

DETAILED DESCRIPTION OF THE INVENTION

Figure 1:
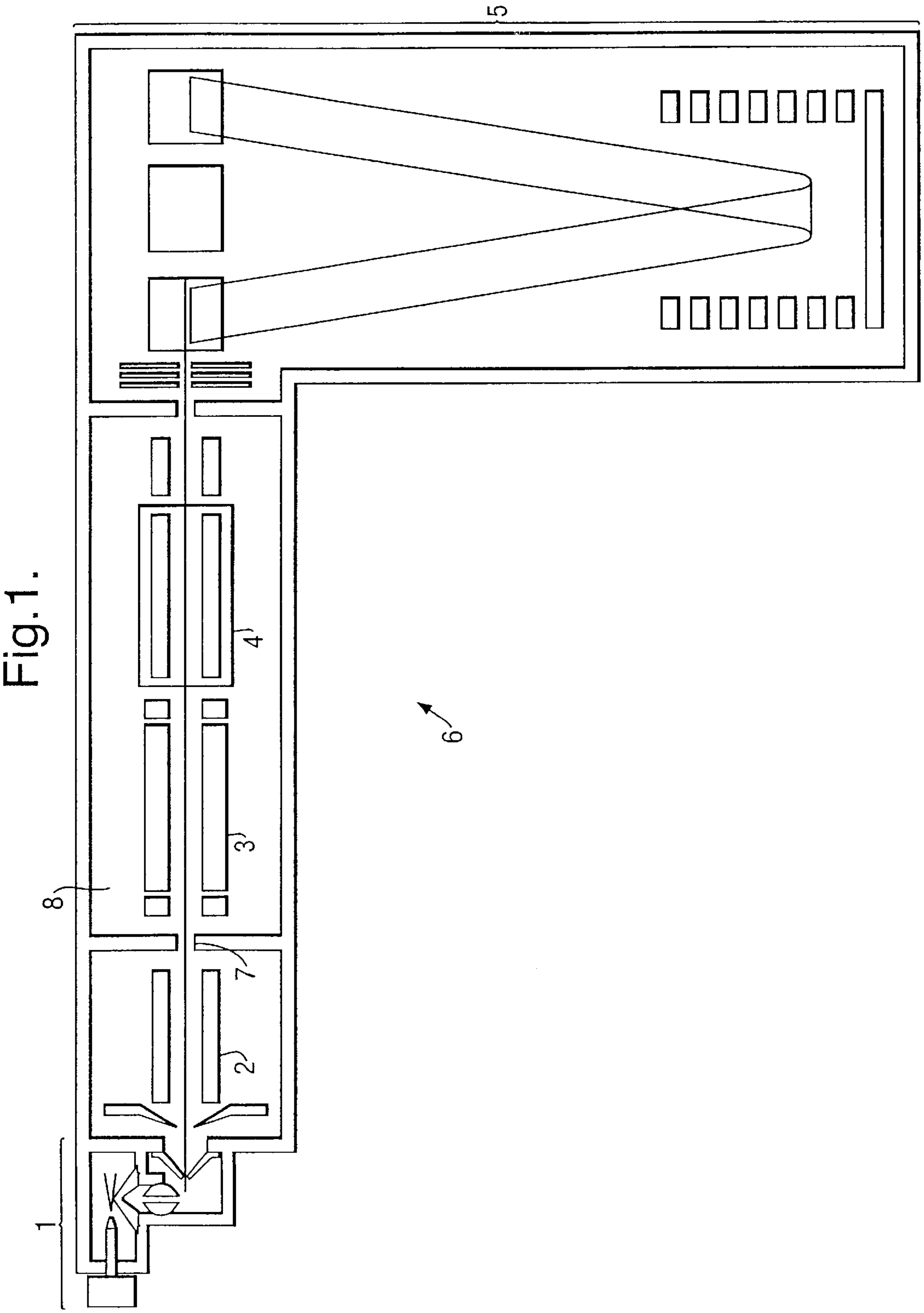
FIG. 1 is a schematic drawing of a preferred arrangement.

A preferred embodiment will now be described with reference to FIG. 1. A mass spectrometer 6 comprises an ion source 1, preferably an electrospray ionization source, an ion guide 2, a quadrupole mass filter 3, a collision cell 4 and an orthogonal acceleration time-of-flight mass analyser 5 incorporating a reflectron. The ion guide 2 and mass filter 3 may be omitted if necessary. The mass spectrometer 6 is preferably interfaced with a chromatograph, such as a liquid chromatograph (not shown) so that the sample entering the ion source 1 may be taken from the eluent of the liquid chromatograph.

The quadrupole mass filter 3 is disposed in an evacuated chamber which is maintained at a relatively low pressure e.g. less than $10^{-5}$ mbar. The rod electrodes comprising the mass filter 3 are connected to a power supply which generates both RF and DC potentials which determine the range of mass-to-charge values that are transmitted by the mass filter 3.

The collision cell 4 may comprise either a quadrupole or hexapole rod set which may be enclosed in a substantially gas-tight casing (other than a small ion entrance and exit orifice) into which a collision gas such as helium, argon, nitrogen, air or methane may be introduced at a pressure of between $10^{-4}$ and $10^{-1}$ mbar, further preferably $10^{-3}$ mbar to $10^{-2}$ mbar. Suitable RF potentials for the electrodes comprising the collision cell 4 are provided by a power supply (not shown).

Ions generated by the ion source 1 are transmitted by ion guide 2 and pass via an interchamber orifice 7 into a vacuum chamber 8. Ion guide 2 is maintained at a pressure intermediate that of the ion source and vacuum chamber 8. In the embodiment shown, ions are mass filtered by mass filter 3 before entering collision cell 4. However, mass filtering is not essential to the present invention. Ions exiting from the collision cell 4 pass into a time-of-flight mass analyser 5. Other ion optical components, such as further ion guides and/or electrostatic lenses, may be present (which are not shown in the figures or described herein) to maximise ion transmission between various parts or stages of the apparatus. Various vacuum pumps (not shown) may be provided for maintaining optimal vacuum conditions in the device. The time-of-flight mass analyser 5 incorporating a reflectron operates in a known way by measuring the transit time of the ions comprised in a packet of ions so that their mass-to-charge ratios can be determined.

A control means (not shown) provides control signals for the various power supplies (not shown) which respectively provide the necessary operating potentials for the ion source 1, ion guide 2, quadrupole mass filter 3, collision cell 4 and the time-of-flight mass analyser 5. These control signals determine the operating parameters of the instrument, for example the mass-to-charge ratios transmitted through the mass filter 3 and the operation of the analyser 5. The control means is typically controlled by signals from a computer (not shown) which may also be used to process the mass spectral data acquired. The computer can also display and store mass spectra produced from the analyser 5 and receive and process commands from an operator. The control means may be automatically set to perform various methods and make various determinations without operator intervention, or may optionally require operator input at various stages.

The control means is also arranged to switch the collision cell 4 back and forth between at least two different modes. In one mode a relatively high voltage such as ≧15V is applied to the collision cell which in combination with the effect of various other ion optical devices upstream of the collision cell 4 is sufficient to cause a fair degree of fragmentation of ions passing therethrough. In a second mode a relatively low voltage such as ≦5V is applied which causes relatively little (if any) significant fragmentation of ions passing therethrough.

The control means switches between modes according to the preferred embodiment approximately every second.

When the mass spectrometer is used in conjunction with an ion source being provided with an eluent separated from a mixture by means of liquid or gas chromatography, the mass spectrometer 6 may be run for several tens of minutes over which period of time several hundred high fragmentation mass spectra and several hundred low fragmentation mass spectra may be obtained.

At the end of the experimental run the data which has been obtained is analysed and parent ions and daughter ions are recognised on the basis of the relative intensity of a peak in a mass spectrum obtained when the collision cell 4 was in one mode compared with the intensity of the same peak in a mass spectrum obtained approximately a second later in time when the collision cell 4 was in the second mode.

According to an embodiment, mass chromatograms for each parent and daughter ion are generated and daughter ions are assigned to parent ions on the basis of their relative elution times.

An advantage of this method is that since all the data is acquired and subsequently processed then all fragment ions may be associated with a parent ion by closeness of fit of their respective elution times. This allows all the parent ions to be identified from their fragment ions, irrespective of whether or not they have been discovered by the presence of a characteristic daughter ion or characteristic "neutral loss".

According to another embodiment an attempt is made to reduce the number of parent ions of interest. A list of possible (i.e. not yet finalised) candidate parent ions is formed by looking for parent ions which may have given rise to a predetermined daughter ion of interest e.g. an immonium ion from a peptide. Alternatively, a search may be made for parent and daughter ions wherein the parent ion could have fragmented into a first component comprising a predetermined ion or neutral particle and a second component comprising a daughter ion. Various steps may then be taken to further reduce/refine the list of possible candidate parent ions to leave a number of final candidate parent ions which are then subsequently identified by comparing elution times of the parent and daughter ions. As will be appreciated, two ions could have similar mass to charge ratios but different chemical structures and hence would most likely fragment differently enabling a parent ion to be identified on the basis of a daughter ion.

EXAMPLE 1

Figure 2:
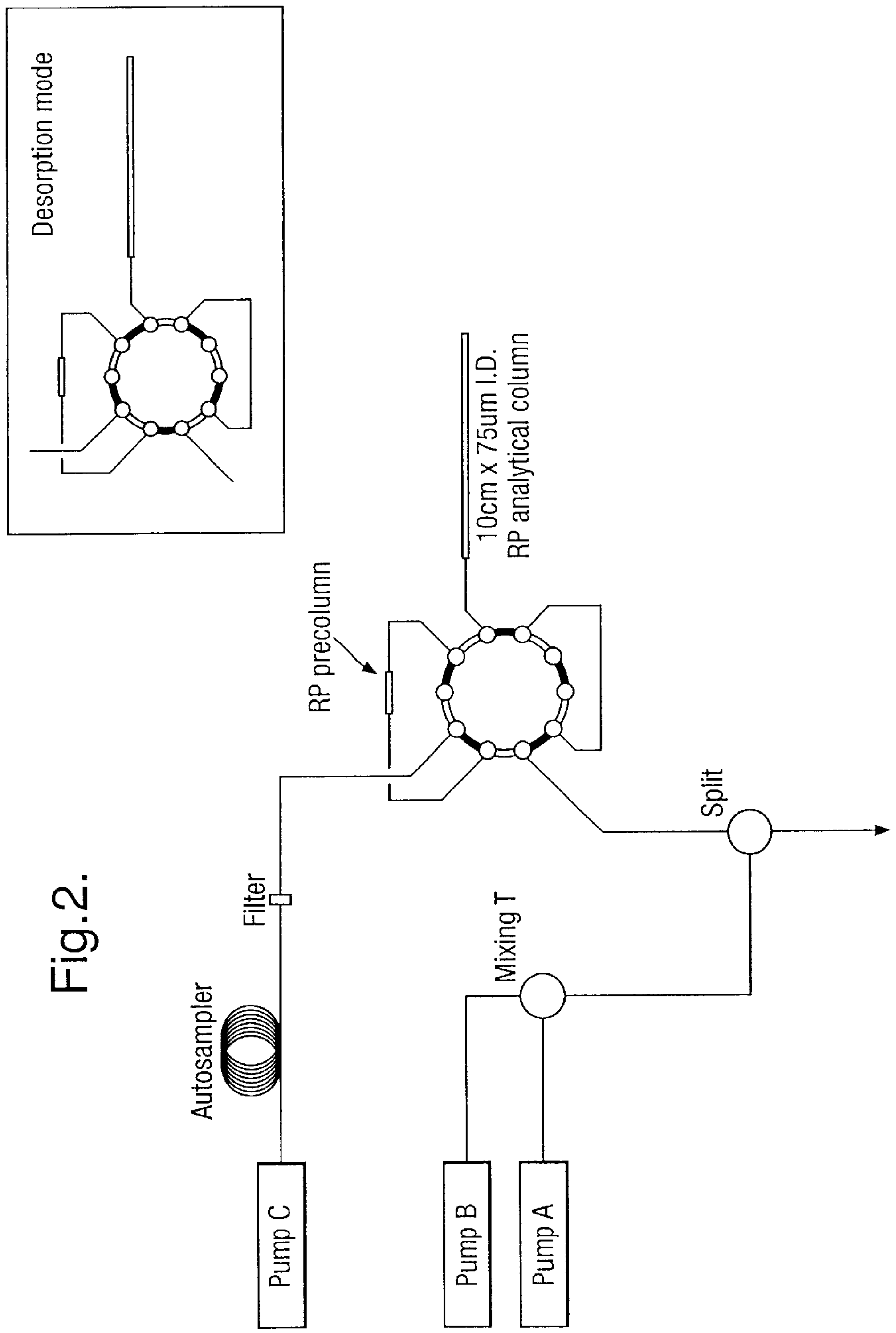
FIG. 2 shows a schematic of a valve switching arrangement during sample loading and desalting. Inset shows desorption of a sample from an analytical column.

According to one embodiment, samples were introduced into the mass spectrometer by means of a Micromass modular CapLC system. Samples were loaded onto a C18 cartridge (0.3 mm×5 mm) and desalted with 0.1% HCOOH for 3 minutes at a flow rate of 30 μL per minute (see FIG. 2). The ten port valve was then switched such that the peptides were eluted onto the analytical column for separation, see inset FIG. 2. The flow from pumps A and B were split to produce a flow rate through the column of approximately 200 nL/min.

The analytical column used was a PicoFrit™ (www.newobjective.com) column packed with Waters Symmetry C18 (www.waters.com). This was set up to spray directly into the mass spectrometer. The electrospray potential (ca. 3 kV) was applied to the liquid via a low dead volume stainless steel union. A small amount (ca. 5 psi) of nebulising gas was introduced around the spray tip to aid the electrospray process.

Data was acquired using a Q-TOF2 quadrupole orthogonal acceleration time-of-flight hybrid mass spectrometer (www.micromass.co.uk), fitted with a Z-spray nanoflow electrospray ion source. The mass spectrometer was operated in the positive ion mode with a source temperature of 80° C. and a cone gas flow rate of 40 L/hr.

The instrument was calibrated with a multi-point calibration using selected fragment ions that resulted from the collision-induced decomposition (CID) of Glu-fibrinopeptide b. All data were processed using the MassLynx suite of software.

Figure 3A:
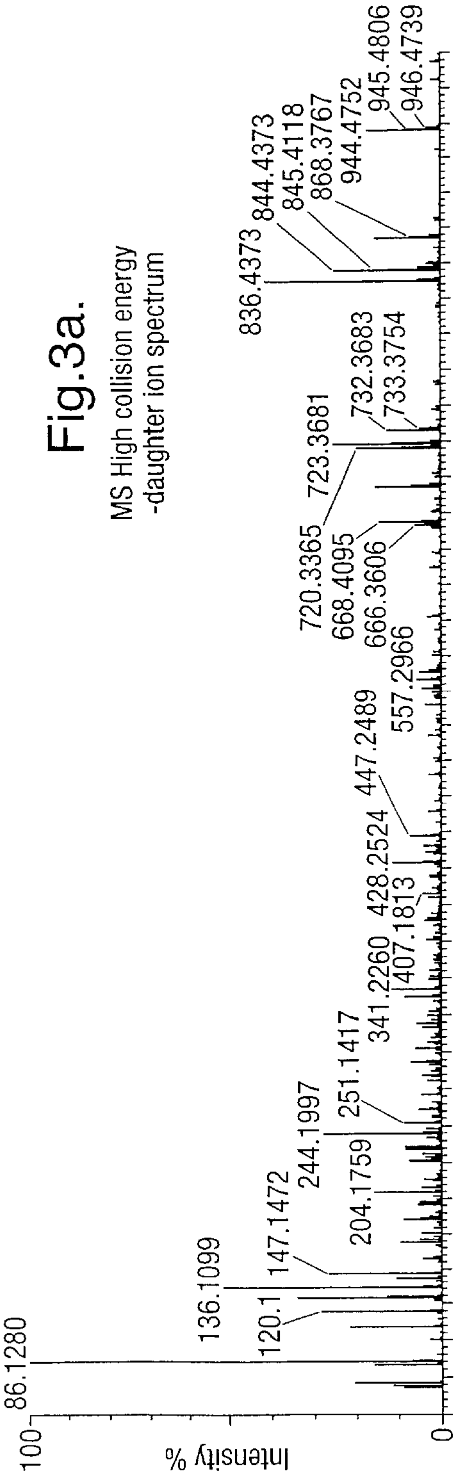
FIG. 3(*a*) shows a daughter ion mass spectrum.
Figure 3B:
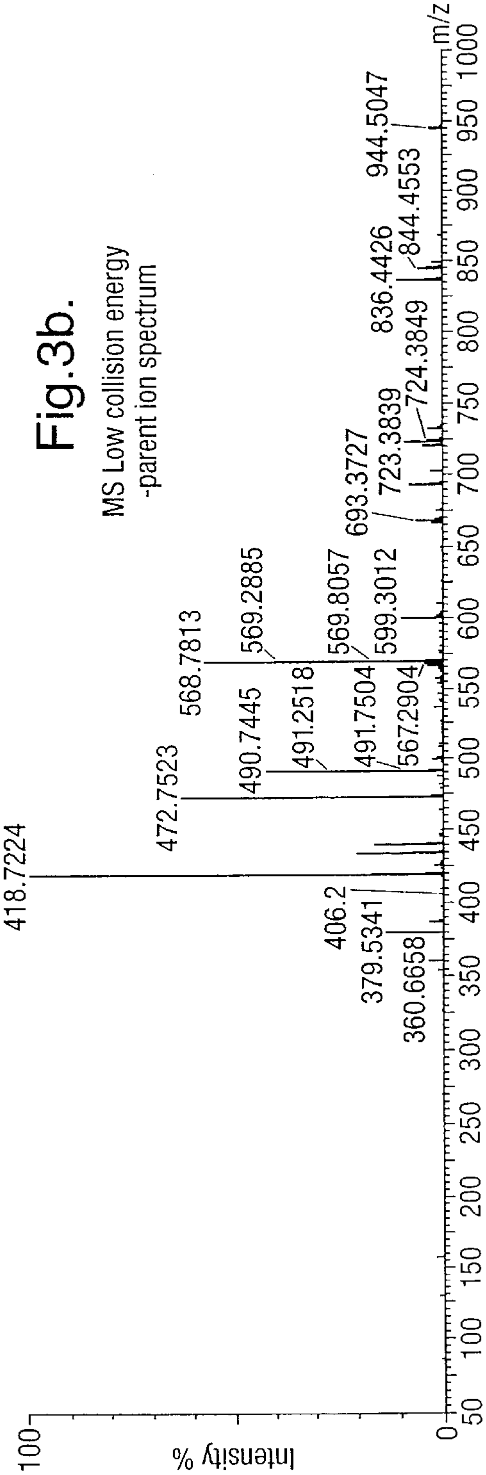
Figure 4A:
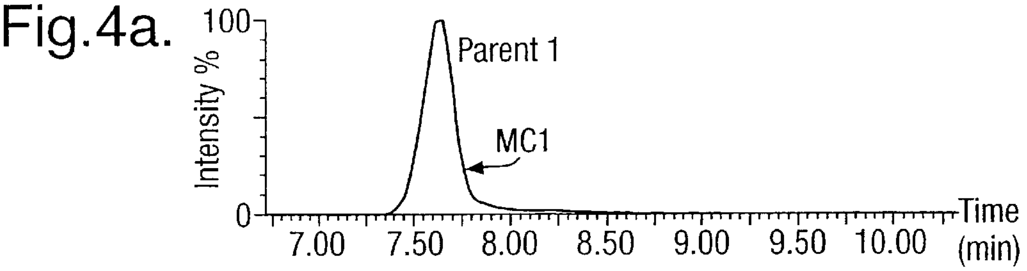
FIGS. 4(*a*)–(*e*) show mass chromatograms showing the time profile of various mass ranges.
Figure 4B:
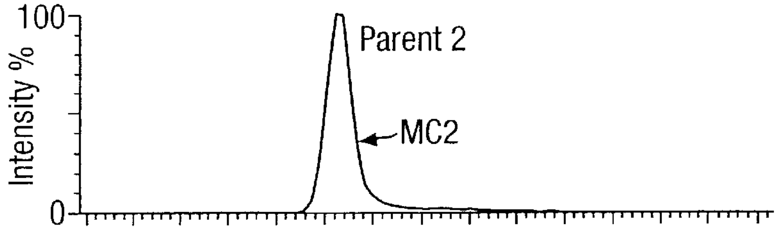
Figure 4C:
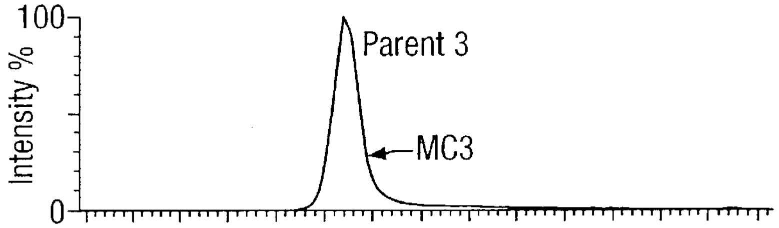
Figure 4D:
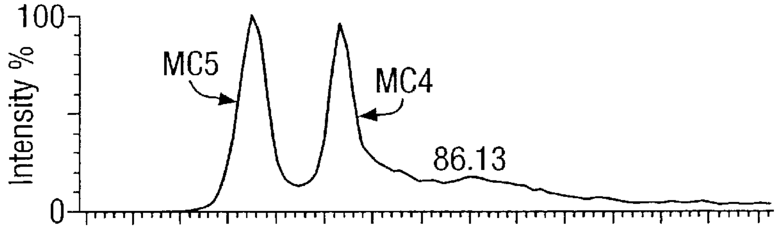
Figure 4E:
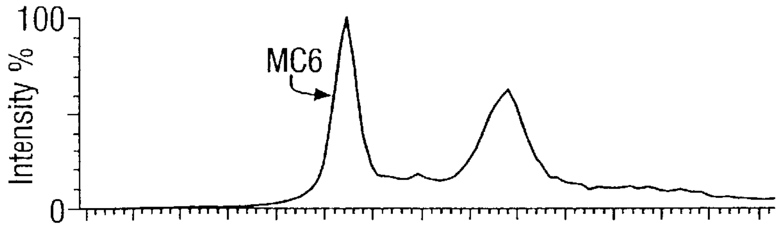

FIGS. 3(*a*) and 3(*b*) show respectively daughter and parent ion spectra of a tryptic digest of ADH known as alcohol dehydrogenase. The daughter ion spectrum shown in FIG. 3(*a*) was obtained while the collision cell voltage was high, e.g. around 30V, which resulted in significant fragmentation of ions passing therethrough. The parent ion spectrum shown in FIG. 3(*b*) was obtained at low collision energy e.g. ≦5V. The data presented in FIG. 3(*b*) was obtained using a mass filter 3 set to transmit ions having a mass to charge value >350. The mass spectra in this particular example were obtained from a sample eluting from a liquid chromatograph, and the spectra were obtained sufficiently rapidly and close together in time that they essentially correspond to the same component or components eluting from the liquid chromatograph.

In FIG. 3(*b*), there are several high intensity peaks in the parent ion spectrum, e.g. the peaks at 418.7724 and 568.7813, which are substantially less intense in the corresponding daughter ion spectrum. These peaks may therefore be recognised as being parent ions. Likewise, ions which are more intense in the daughter ion spectrum than in the parent ion spectrum may be recognised as being daughter ions (or indeed are not present in the parent ion spectrum due to the operation of a mass filter upstream of the collision cell). All the ions having a mass to charge value <350 in FIG. 3(*a*) can therefore be readily recognised as daughter ions either on the basis that they have a mass to charge value less than 350 or more preferably on the basis of their relative intensity with respect to the corresponding parent ion spectrum.

FIGS. 4(*a*)–(*e*) show respectively mass chromatograms (i.e. plots of detected ion intensity versus acquisition time) for three parent ions and two daughter ions. The parent ions were determined to have mass to charge ratios of 406.2 (peak "MC1"), 418.7 (peak "MC2") and 568.8 (peak "MC3") and the two daughter ions were determined to have mass to charge ratios of 136.1 (peaks "MC4" and "MC5") and 120.1 (peak "MC6").

It can be seen that parent ion peak MC1 correlates well with daughter ion peak MC5 i.e. a parent ion with m/z=406.2 seems to have fragmented to produce a daughter ion with m/z=136.1. Similarly, parent ion peaks MC2 and MC3 correlate well with daughter ion peaks MC4 and MC6, but it is difficult to determine which parent ion corresponds with which daughter ion.

Figure 5:
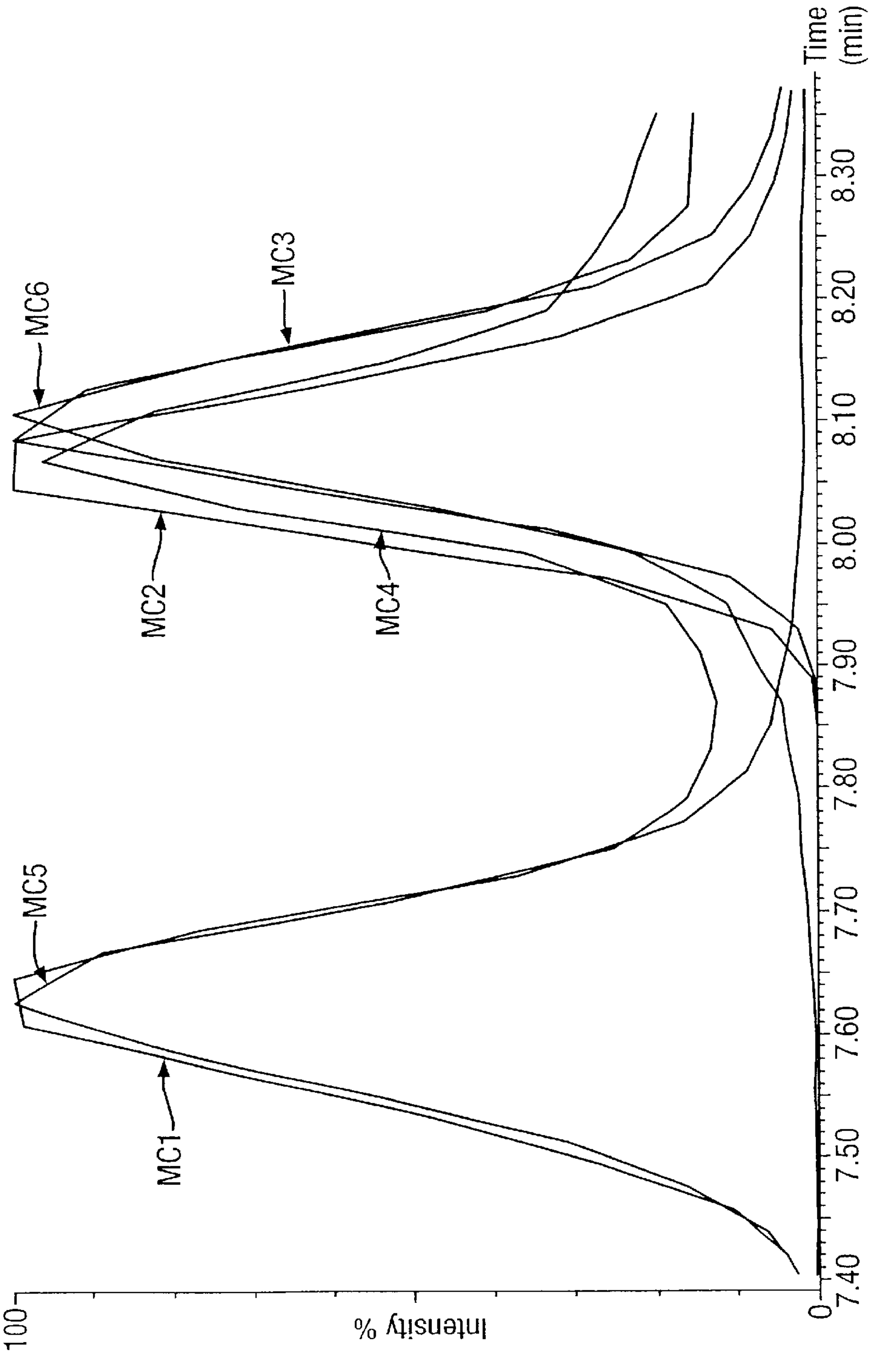
FIG. 5 shows the mass chromatograms of FIGS. 4(*a*)–(*e*) superimposed upon one another.

FIG. 5 shows the peaks of FIGS. 4(*a*)–(*e*) overlaid on top of one other (drawn at a different scale). By careful comparison of the peaks of MC2, MC3, MC4 and MC6 it can be seen that in fact parent ion MC2 and daughter ion MC4 correlate well whereas parent ion MC3 correlates well with daughter ion MC6. This suggests that parent ions with m/z=418.7 fragmented to produce daughter ions with m/z=136.1 and that parent ions with m/z=568.8 fragmented to produce daughter ions with m/z=120.1.

This cross-correlation of mass chromatograms can be carried out by an operator or more preferably by automatic peak comparison means such as a suitable peak comparison software program running on a suitable computer.

EXAMPLE 2

Automated Discovery of a Peptide Containing the Amino Acid Asparagine

Figure 6:
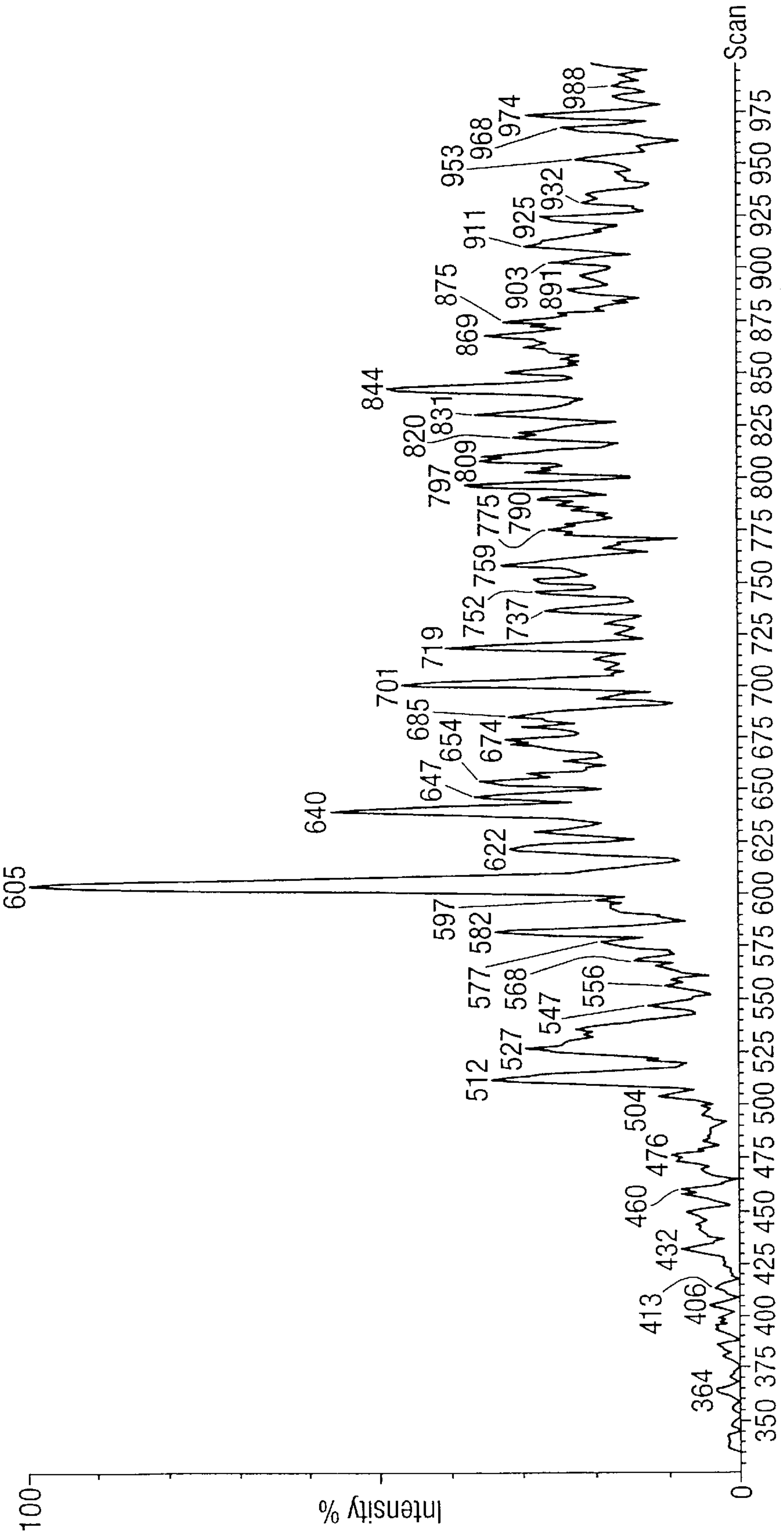
FIG. 6 shows a mass chromatogram of 87.04 (Asparagine immonium ion)

FIG. 6 show the mass chromatogram for m/z 87.04 extracted from a HPLC separation and mass analysis obtained using Micromass' Q-TOF mass spectrometer. The immonium ion for the amino acid Asparagine has a m/z value of 87.04. This chromatogram was extracted from all the high energy spectra recorded on the Q-TOF.

Figure 7:
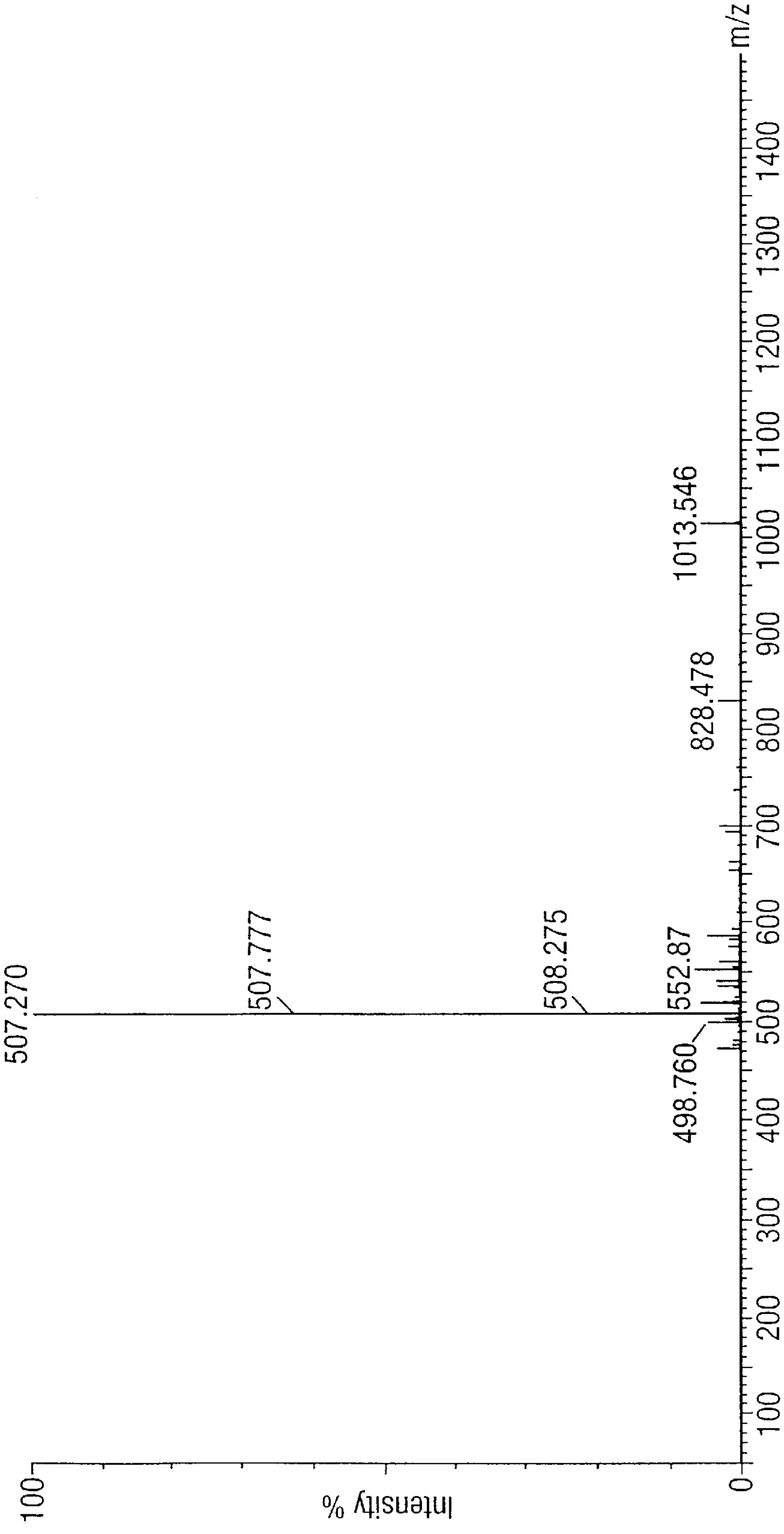
FIG. 7 shows a fragment T5 from ADH sequence ANELLINVK MW 1012.59.

FIG. 7 shows the full mass spectrum corresponding to scan number 604. This was a low energy mass spectrum recorded on the Q-TOF, and is the low energy spectrum next to the high energy spectrum at scan 605 that corresponds to the largest peak in the mass chromatogram of m/z 87.04. This shows that the parent ion for the Asparagine immonium ion at m/z 87.04 has a mass of 1012.54 since it shows the singly charged $(M+H)^+$ ion at m/z 1013.54, and the doubly charged $(M+2H)^{++}$ ion at m/z 507.27.

EXAMPLE 3

Automated Discovery of Phosphorylation of a Protein by Neutral Loss

Figure 8:
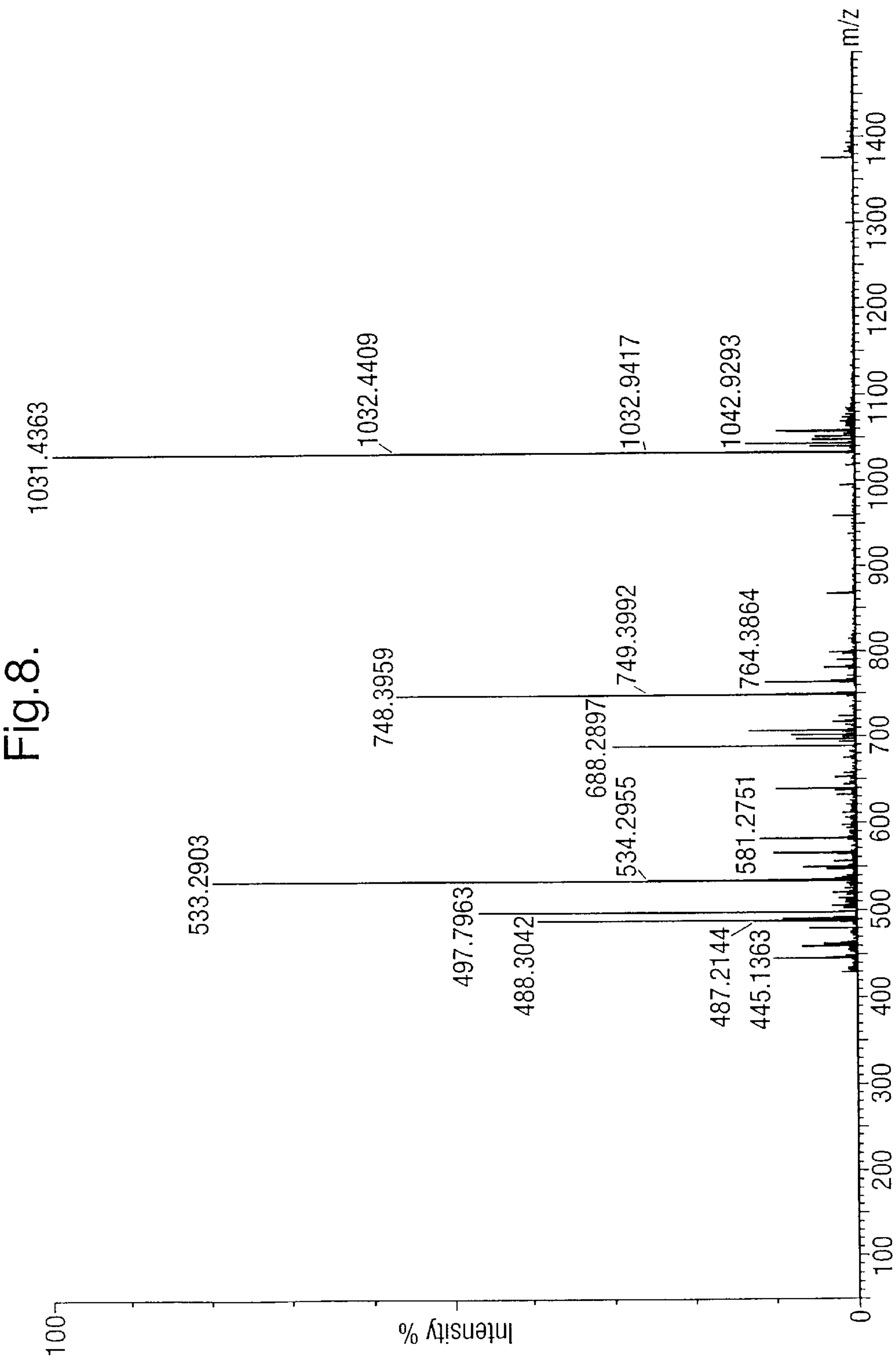
FIG. 8 shows a mass spectrum for the low energy spectra of a tryptic digest of β-Caesin.

FIG. 8 shows a mass spectrum from the low energy spectra recorded on a Q-TOF mass spectrometer of a tryptic digest of the protein β-Caesin. The protein digest products were separated by HPLC and mass analysed. The mass spectra were recorded on the Q-TOF operating in the MS mode and alternating between low and high collision energy in the gas collision cell for successive spectra.

Figure 9:
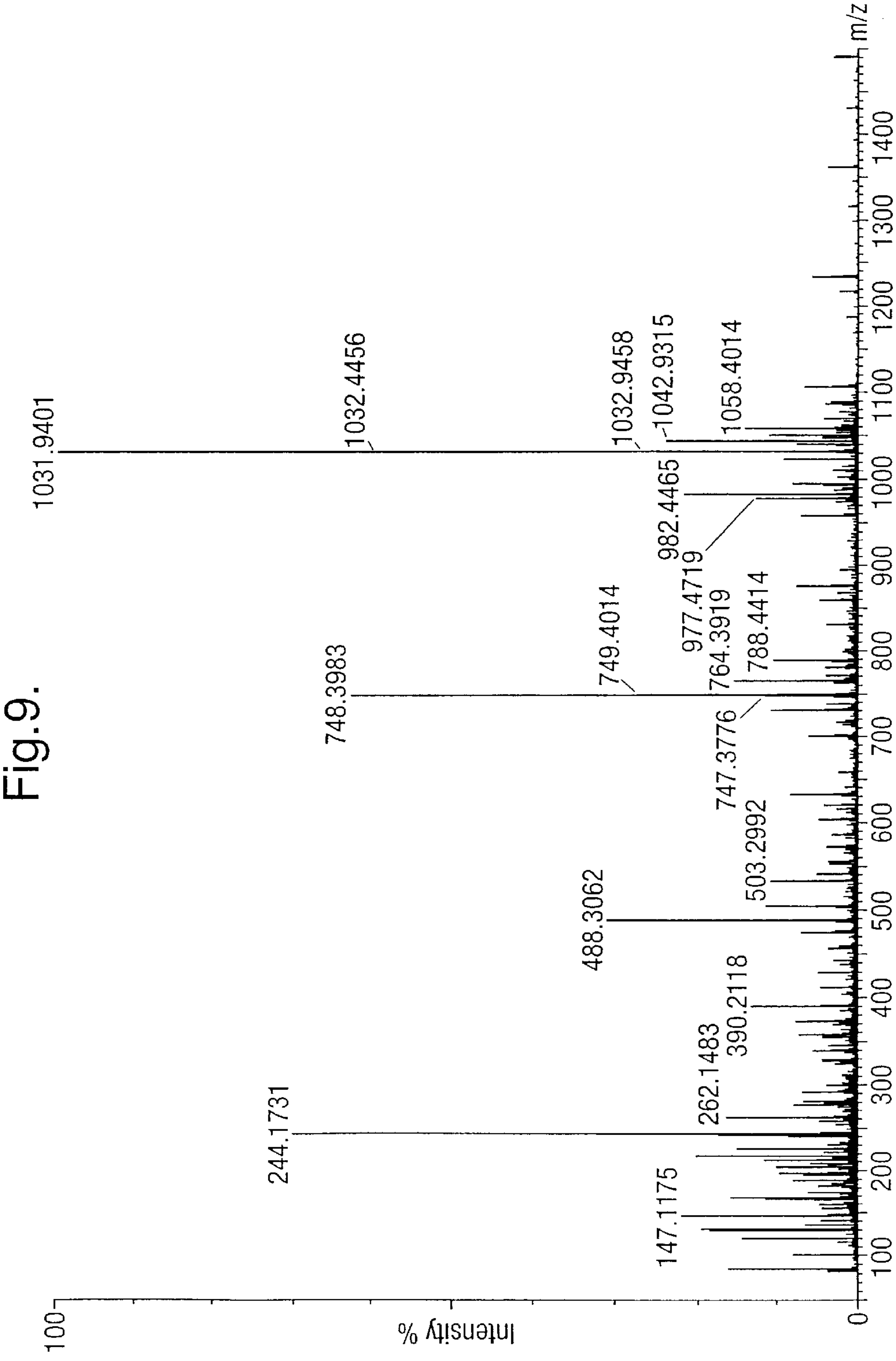
FIG. 9 shows a mass spectrum for the high energy spectra of a tryptic digest of β-Caesin.

FIG. 9 shows the mass spectrum from the high energy spectra recorded during the same period of the HPLC separation as that in FIG. 8 above.

Figure 10:
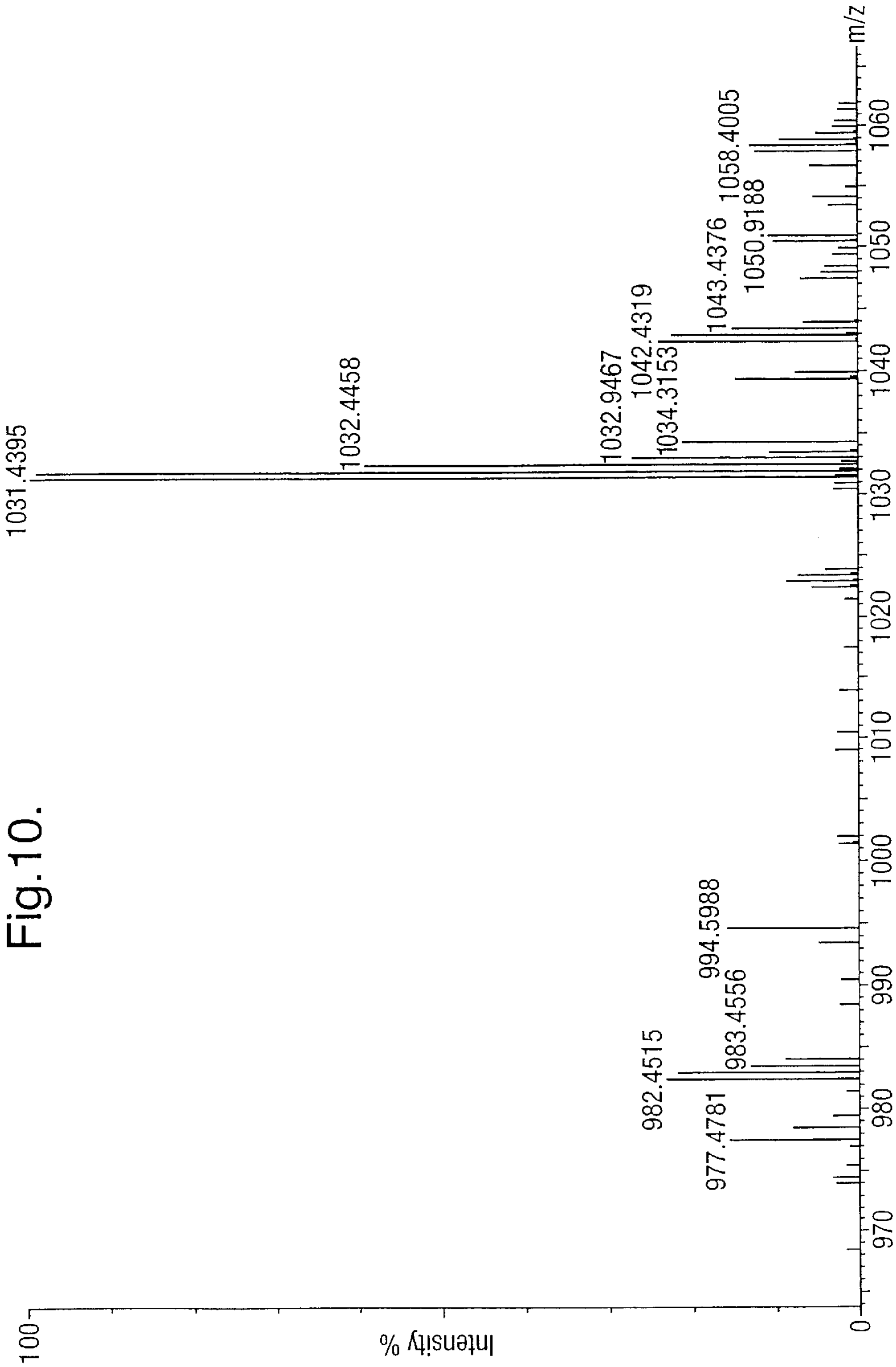
FIG. 10 shows a processed and expanded view of the same spectrum as in FIG. 9.

FIG. 10 shows a processed and expanded view of the same spectrum as in FIG. 9 above. For this spectrum, the continuum data has been processed such to identify peaks and display as lines with heights proportional to the peak area, and annotated with masses corresponding to their centroided masses. The peak at m/z 1031.4395 is the doubly charged $(M+2H)^{++}$ ion of a peptide, and the peak at m/z 982.4515 is a doubly charged fragment ion. It has to be a fragment ion since it is not present in the low energy spectrum. The mass difference between these ions is 48.9880. The theoretical mass for $H_3PO_4$ is 97.9769, and the m/z value for the doubly charged $H_3PO_4^{++}$ ion is 48.9884, a difference of only 8 ppm from that observed.

What is claimed is:

1. A method of mass spectrometry comprising the steps of:

(a) providing an ion source for generating ions;

(b) passing said ions to a fragmentation means including a collision cell;

(c) operating said fragmentation means in a first mode wherein at least a portion of said ions are fragmented to produce daughter ions;

(d) recording a mass spectrum of ions emerging from said fragmentation means operating in said first mode as a high fragmentation mass spectrum;

(e) switching said fragmentation means to operate in a second mode wherein substantially less ions are fragmented;

(f) recording a mass spectrum of ions emerging from said fragmentation means operating in said second mode as a low fragmentation mass spectrum; and (g) repeating steps (c)–(f) a plurality of times.

2. The method of mass spectrometry as claimed in claim 1, further comprising the step of recognising parent ions.

3. The method of mass spectrometry as claimed in claim 2, comprising the steps of:

comparing a high fragmentation mass spectrum with a low fragmentation mass spectrum obtained at substantially the same time; and recognising as parent ions, ions having a greater intensity in the low fragmentation mass spectrum relative to the high fragmentation mass spectrum.

4. The method of mass spectrometry as claimed in claim 3, further comprising the step of selecting a sub-group of possible candidate parent ions from all the parent ions.

5. The method of mass spectrometry as claimed in claim 4, wherein possible candidate parent ions are selected on the basis of their relationship to a predetermined daughter ion.

6. The method of mass spectrometry as claimed in claim 5, further comprising the steps of:

generating a predetermined daughter ion mass chromatogram for said predetermined daughter ion using high fragmentation mass spectra;

determining the centre of each peak in said predetermined daughter ion mass chromatogram; and determining the corresponding predetermined daughter ion elution time(s).

7. The method of mass spectrometry as claimed in claim 6, further comprising, for each peak in said predetermined daughter ion mass chromatogram, the steps of:

interrogating both the low fragmentation mass spectrum obtained immediately before the predetermined daughter ion elution time and the low fragmentation mass spectrum obtained immediately after the predetermined daughter ion elution time for the presence of previously recognised parent ions;

generating a possible candidate parent ion mass chromatogram for any previously recognised parent ion found to be present in both the low fragmentation mass spectrum obtained immediately before the predetermined daughter ion elution time and the low fragmentation mass spectrum obtained immediately after the predetermined daughter ion elution time;

determining the centre of each peak in each said possible candidate parent ion mass chromatogram; and determining the corresponding possible candidate parent ion elution time(s).

8. The method of mass spectrometry as claimed in claim 7, further comprising the step of ranking possible candidate parent ions according to the closeness of fit of their elution time with said predetermined daughter ion elution time.

9. The method of mass spectrometry as claimed in claim 8, further comprising the step of forming a list of final candidate parent ions from said possible candidate parent ions by rejecting possible candidate parent ions if the elution time of a possible candidate parent ion precedes or exceeds said predetermined daughter ion elution time by more than a predetermined amount.

10. The method as claimed in claim 9, further comprising the step of identifying each final candidate parent ion.

11. The method as claimed in claim 10, further comprising, for each final candidate parent ion, the steps of:

recalling the elution time of said final candidate parent ion;

generating a list of possible candidate daughter ions which comprises previously recognised daughter ions which are present in both the low fragmentation mass spectrum obtained immediately before the elution time of said final candidate parent ion and the low fragmentation mass spectrum obtained immediately after the elution time of said final candidate parent ion;

generating a possible candidate daughter ion mass chromatogram of each possible candidate daughter ion;

determining the centre of each peak in each said possible candidate daughter ion mass chromatogram; and determining the corresponding possible candidate daughter ion elution time(s).

12. The method as claimed in claim 11, further comprising the step of forming a list of final candidate daughter ions from said possible candidate daughter ions by rejecting possible candidate daughter ions if the elution time of said possible candidate daughter ion precedes or exceeds the elution time of said final candidate parent ion by more than a predetermined amount.

13. The method as claimed in claim 12, further comprising the steps of:

generating a list of neighbouring parent ions which are present in the low fragmentation mass spectrum obtained nearest in time to the elution time of said final candidate parent ion;

generating a neighbouring parent ion mass chromatogram of each parent ion contained in said list;

determining the centre of each neighbouring parent ion mass chromatogram; and determining the corresponding neighbouring parent ion elution time(s).

14. The method as claimed in claim 13, further comprising the rejecting from said list of final candidate daughter ions any final candidate daughter ion having an elution time which corresponds more closely with a neighbouring parent ion elution time than with the elution time of said final candidate parent ion.

15. The method as claimed in claim 12, further comprising the step of assigning final candidate daughter ions to said final candidate parent ion according to the closeness of fit of their elution times.

16. The method as claimed in claim 15, further comprising the step of listing all final candidate daughter ions which have been associated with said final candidate parent ion.

17. The method as claimed in claim 11, further comprising the step of ranking possible candidate daughter ions according to the closeness of fit of their elution time with the elution time of said final candidate parent ion.

18. The method as claimed in claim 9, wherein said predetermined amount is selected from the group consisting of: (i) 0.25 seconds; (ii) 0.5 seconds; (iii) 0.75 seconds; (iv) 1 second; (v) 2.5 seconds; (vi) 5 seconds; (vii) 10 seconds; and (viii) a time corresponding to 5% of the width of a chromatography peak measured at half height.

19. The method as claimed in claim 3, further comprising the step of:

generating a parent ion mass chromatogram for each recognised parent ion;

determining the centre of each peak in said parent ion mass chromatogram;

determining the corresponding parent ion elution time(s);

generating a daughter ion mass chromatogram for each recognised daughter ion;

determining the centre of each peak in said daughter ion mass chromatogram; and determining the corresponding daughter ion elution time (s).

20. The method as claimed in claim 19, further comprising assigning daughter ions to parent ions according to the closeness of fit of their respective elution times.

21. The method as claimed in claim 20, further comprising the step of listing all daughter ions which have been associated with each parent ion.

22. The method of mass spectrometry as claimed in claim 4, wherein possible candidate parent ions are selected on the basis of their giving rise to a predetermined mass loss.

23. The method of mass spectrometry as claimed in claim 22, further comprising, for each low fragmentation mass spectrum, the steps of:

generating a list of target daughter ion mass to charge values that would result from the loss of a predetermined ion or neutral particle from each previously recognised parent ion present in said low fragmentation mass spectrum;

interrogating both the high fragmentation mass spectrum obtained immediately before said low fragmentation mass spectrum and the high fragmentation mass spectrum obtained immediately after said low fragmentation mass spectrum for the presence of daughter ions having a mass to charge value corresponding with a said target daughter ion mass to charge value; and forming a list of possible candidate parent ions, optionally together with their corresponding daughter ions, by including in said list a parent ion if a daughter ion having a mass to charge value corresponding with a said target daughter ion mass to charge value is found to be present in both the high fragmentation mass spectrum immediately before said low fragmentation mass spectrum and the high fragmentation mass spectrum immediately after said low fragmentation mass spectrum.

24. The method of mass spectrometry as claimed in claim 23, further comprising, for each possible candidate parent ion:

generating a possible candidate parent ion mass chromatogram for the possible candidate parent ion using the low fragmentation mass spectra;

generating a corresponding daughter ion mass chromatogram for the corresponding daughter ion;

determining the centre of each peak in said possible candidate parent ion mass chromatogram and said corresponding daughter ion mass chromatogram; and determining the corresponding possible candidate parent ion elution time(s) and corresponding daughter ion elution time(s).

25. The method of mass spectrometry as claimed in claim 24, further comprising the step of forming a list of final candidate parent ions from said possible candidate parent ions by rejecting possible candidate parent ions if the elution time of a possible candidate parent ion precedes or exceeds the corresponding daughter ion elution time by more than a predetermined amount.

26. The method of mass spectrometry as claimed in claim 23, further comprising the steps of:

generating a mass loss chromatogram based upon possible candidate parent ions and their corresponding daughter ions;

determining the centre of each peak in said mass loss chromatogram; and determining the corresponding mass loss elution time(s).

27. The method of mass spectrometry as claimed in claim 1, further comprising the step of recognising daughter ions.

28. The method as claimed in claim 27, wherein ions generated by said ion source are passed through a mass filter, preferably a quadrupole mass filter, prior to being passed to said fragmentation means, said mass filter substantially transmitting ions having a mass to charge value falling within a certain range and substantially attenuating ions having a mass to charge value falling outside of said range.

29. The method as claimed in claim 28, wherein ions are recognised as daughter ions if said ions are present in a high fragmentation mass spectrum and have a mass to charge value falling outside of said range.

30. The method of mass spectrometry as claimed in claim 27, comprising the steps of:

comparing a high fragmentation mass spectrum with a low fragmentation mass spectrum obtained at substantially the same time; and recognising as daughter ions, ions having a greater intensity in the high fragmentation mass spectrum relative to the low fragmentation mass spectrum.

31. The method as claimed in claim 1, further comprising identifying a parent ion on the basis of the mass to charge ratio of said parent ion.

32. The method as claimed in claim 1, further comprising identifying a parent ion on the basis of the mass to charge ratio of one or more daughter ions.

33. The method as claimed in claim 1, further comprising identifying a protein by determining the mass to charge ratio of one or more parent ions, said one or more parent ions preferably comprising peptides of said protein.

34. The method as claimed in claim 1, further comprising identifying a protein by determining the mass to charge ratio of one or more daughter ions, said one or more daughter ions preferably comprising fragments of peptides of said protein.

35. The method as claimed in claim 33, wherein the mass to charge ratio of said one or more parent ions is searched against a database, said database preferably comprising known proteins.

36. The method as claimed in claim 35, further comprising searching high fragmentation mass spectra for the presence of daughter ions which might be expected to result from the fragmentation of a parent ion.

37. The method as claimed in claim 33, wherein the mass to charge ratios of said one or more parent ions and/or said one or more daughter ions are searched against a database, said database preferably being comprising known proteins.

38. The method of mass spectrometry as claimed in claim 1, further comprising: introducing a collision gas, selected from the group consisting of helium, argon, nitrogen and methane, into the collision cell prior to passing said ions to the fragmentation means.

39. The method of mass spectrometry as claimed in claim 1, further comprising: introducing a collision gas, selected from the group consisting of helium, argon, nitrogen and methane, into the collision cell prior to passing said ions to the collision cell.

40. A method of mass spectrometry comprising the steps of:

(a) providing an ion source for generating ions;

(b) passing said ions to a collision cell;

(c) operating said collision cell in a first mode wherein at least a portion of said ions are fragmented to produce daughter ions;

(d) recording a mass spectrum of ions emerging from said collision cell operating in said first mode as a high fragmentation mass spectrum;

(e) switching said collision cell to operate in a second mode wherein substantially less ions are fragmented;

(f) recording a mass spectrum of ions emerging from said collision cell operating in said second mode as a low fragmentation mass spectrum;

(g) repeating steps (c)–(f) a plurality of times; and then (h) recognising parent and daughter ions from the high fragmentation and low fragmentation mass spectra.

41. The method as claimed in claim 40, further comprising the steps of:

(i) generating a parent ion mass chromatogram for each parent ion;

(j) determining the centre of each peak in said parent ion mass chromatogram;

(k) determining the corresponding parent ion elution time(s);

(l) generating a daughter ion mass chromatogram for each daughter ion;

(m) determining the centre of each peak in said daughter ion mass chromatogram; and (n) determining the corresponding daughter ion elution time(s).

42. The method as claimed in claim 41, further comprising assigning daughter ions to parent ions according to the closeness of fit of their respective elution times.

43. The method as claimed in claim 40, further comprising providing a mass filter having a mass to charge ratio transmission window upstream of said collision cell.

44. The method as claimed in claim 43, wherein daughter ions are recognised by recognising ions present in a high fragmentation spectrum having a mass to charge value which falls outside of the transmission window of said mass filter.

45. A mass spectrometer, comprising:

an ion source;

a collision cell operable in a first mode wherein at least a portion of said ions are fragmented to produce daughter ions, and a second mode wherein substantially less ions are fragmented; and a mass analyser;

characterised in that said mass spectrometer further comprises:

a control system which, in use, repeatedly switches said collision cell back and forth between said first and said second modes.

46. The mass spectrometer as claimed in claim 45, wherein said ion source is selected from the group consisting of: (i) an electrospray ion source; (ii) an atmospheric pressure chemical ionization ion source; and (iii) a matrix assisted laser desorption ion source.

47. The mass spectrometer as claimed in claim 46, wherein said ion source is provided with an eluent over a period of time, said eluent having been separated from a mixture by means of liquid chromatography or capillary electrophoresis.

48. The mass spectrometer as claimed in claim 45, wherein said ion source is selected from the group consisting of: (i) an electron impact ion source; (ii) a chemical ionization ion source; and (iii) a field ionisation ion source.

49. The mass spectrometer as claimed in claim 48, wherein said ion source is provided with an eluent over a period of time, said eluent having been separated from a mixture by means of gas chromatography.

50. The mass spectrometer as claimed in claim 45, further comprising a mass filter upstream of said collision cell.

51. The mass spectrometer as claimed in claim 50, wherein said mass filter has a highpass filter characteristic.

52. The mass spectrometer as claimed in claim 51, wherein said mass filter is arranged to transmit ions having a mass to charge ratio selected from the group consisting of: (i) ≧100; (ii) ≧150; (iii) ≧200; (iv) ≧250; (v) ≧300; (vi) ≧350; (vii) ≧400; (viii) ≧450; and (ix) ≧500.

53. The mass spectrometer as claimed in claim 50, wherein said mass filter has a lowpass or bandpass filter characteristic.

54. The mass spectrometer as claimed in claim 45, further comprising an ion guide upstream of said collision cell, said ion guide selected from the group consisting of: (i) a hexapole; (ii) a quadrupole; (iii) an octapole; (iv) a plurality of ring electrodes having substantially constant internal diameters; and (v) a plurality of ring electrodes having substantially tapering internal diameters.

55. The mass spectrometer as claimed in claim 45, wherein said mass analyser is selected from the group consisting of: (i) a quadrupole mass filter; (ii) a time-of-flight mass analyser; (iii) an ion trap; (iv) a magnetic sector analyser; and (v) a Fourier Transform Ion Cyclotron Resonance ("FTICR") mass analyser.

56. The mass spectrometer as claimed in claim 45, wherein said collision cell is selected from the group consisting of: (i) a quadrupole rod set; (ii) an hexapole rod set; and (iii) an octopole rod set.

57. The mass spectrometer as claimed in claim 56, wherein said collision cell forms a substantially gas-tight enclosure.

58. The mass spectrometer as claimed in claim 45, wherein in said first mode said control system arranges to supply a voltage to said collision cell selected from the group consisting of: (i) ≧15V; (ii) ≧20V; (iii) ≧25V; (iv) ≧30V; (v) ≧50V; (vi) ≧100V; (vii) ≧150V; and (viii) ≧200V.

59. The mass spectrometer as claimed in claim 45, wherein in said second mode said control system arranges to supply a voltage to said collision cell selected from the group consisting of: (i) ≦5V; (ii) ≦4.5V; (iii) ≦4V; (iv) ≦3.5V; (v) ≦3V; (vi) ≦2.5V; (vii) ≦2V; (viii) ≦1.5V; (ix) ≦1V; (x) ≦0.5V; and (xi) substantially 0V.

60. The mass spectrometer as claimed in claim 45, wherein the collision cell contains a collision gas selected from the group consisting of helium, argon, nitrogen and methane.

61. A mass spectrometer, comprising:

an ion source;

a collision cell operable in a first mode wherein at least a portion of said ions are fragmented to produce daughter ions, and a second mode wherein substantially less ions are fragmented; and a mass analyser;

characterised in that said mass spectrometer further comprises:

a control system which, in use, repeatedly switches said collision cell back and forth between said first mode wherein a voltage ≧15V is applied to said collision cell and said second mode wherein a voltage ≦5V is applied to said collision cell.

62. The mass spectrometer as claimed in claim 61, wherein the collision cell contains a collision gas selected from the group consisting of helium, argon, nitrogen and methane.

63. A mass spectrometer, comprising:

an atmospheric pressure ion source arranged to be provided with an eluent over a period of time, said eluent having been separated from a mixture by means of gas or liquid chromatography;

a collision cell switchable between at least two modes wherein ions entering said collision cell are fragmented in said at least two modes to different degrees;

a mass analyser, preferably a time of flight mass analyser; and a control system for automatically switching said collision cell between said at least two modes at least once every 0.1, 0.2, 0.3, 0.4, 0.5, 0.6, 0.7, 0.8, 0.9, 1, 2, 3, 4, 5, 6, 7, 8, 9 or 10 seconds.

64. The mass spectrometer as claimed in claim 63, wherein the collision cell contains a collision gas selected from the group consisting of helium, argon, nitrogen and methane.

* * * * *